(12) United States Patent
Sutardja

(10) Patent No.: US 7,958,292 B2
(45) Date of Patent: Jun. 7, 2011

(54) DISK DRIVE SYSTEM ON CHIP WITH INTEGRATED BUFFER MEMORY AND SUPPORT FOR HOST MEMORY ACCESS

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 737 days.

(21) Appl. No.: 10/926,486

(22) Filed: Aug. 19, 2004

(65) Prior Publication Data

US 2005/0289262 A1 Dec. 29, 2005

Related U.S. Application Data

(60) Provisional application No. 60/582,259, filed on Jun. 23, 2004.

(51) Int. Cl.
*G06F 13/38* (2006.01)

(52) U.S. Cl. .............. 710/74; 710/29; 710/36; 711/114; 711/112

(58) Field of Classification Search .................... 710/74, 710/36, 29; 711/114, 112
See application file for complete search history.

(56) References Cited

U.S. PATENT DOCUMENTS

| | | | |
|---|---|---|---|
| 4,456,965 A | 6/1984 | Graber et al. | |
| 4,747,047 A | 5/1988 | Coogan et al. | |
| 5,210,855 A | 5/1993 | Bartol | |
| 5,220,275 A | 6/1993 | Holmqvist | |
| 5,222,062 A | 6/1993 | Sharma et al. | |
| 5,274,665 A | 12/1993 | Schilling | |
| 5,331,646 A | 7/1994 | Krueger et al. | |
| 5,446,767 A | 8/1995 | Nakagawa et al. | |
| 5,471,152 A | 11/1995 | Gheewala et al. | |
| 5,471,585 A | 11/1995 | Barakat et al. | |
| 5,530,960 A * | 6/1996 | Parks et al. | 710/5 |
| 5,553,230 A | 9/1996 | Petersen et al. | |
| 5,564,114 A | 10/1996 | Popat et al. | |
| 5,661,765 A | 8/1997 | Ishizu | |
| 5,748,645 A | 5/1998 | Hunter et al. | |
| 5,783,960 A | 7/1998 | Lackey | |
| 5,787,485 A | 7/1998 | Fitzgerald et al. | |
| 5,802,318 A | 9/1998 | Murray et al. | |
| 5,812,754 A | 9/1998 | Lui et al. | |
| 5,826,048 A | 10/1998 | Dempsey et al. | |

(Continued)

FOREIGN PATENT DOCUMENTS

EP 0876016 11/1998

(Continued)

OTHER PUBLICATIONS

Serial ATA II; Extensions to Serial ATA, 1.0, Revision 1.0, Oct. 16, 2002, APT Technologies, Inc., Dell Computer Corporation, Intel Corporation, Maxtor Corporation, Seagate Technology.

(Continued)

*Primary Examiner* — Chun-Kuan Lee
*Assistant Examiner* — Ernest Unelus

(57) ABSTRACT

A circuit for a storage device that communicates with a host device comprises a first high speed interface. A storage controller communicates with the high speed interface. A buffer communicates with the storage controller. The storage device generates storage buffer data during operation. The storage controller is adapted to selectively store the storage buffer data in at least one of the buffer and/or in the host device via the high speed interface. A bridge chip for enterprise applications couples the circuit to an enterprise device.

84 Claims, 11 Drawing Sheets

U.S. PATENT DOCUMENTS

| | | | |
|---|---|---|---|
| 5,828,854 A | 10/1998 | Wade | |
| 5,848,278 A | 12/1998 | Sakai | |
| 5,854,941 A | 12/1998 | Ballard et al. | |
| 5,886,901 A | 3/1999 | Magoshi | |
| 5,894,560 A | 4/1999 | Carmichael et al. | |
| 5,909,451 A | 6/1999 | Lach et al. | |
| 6,009,275 A | 12/1999 | DeKoning et al. | |
| 6,021,462 A | 2/2000 | Minow et al. | |
| 6,057,863 A | 5/2000 | Olarig | |
| 6,059,836 A | 5/2000 | Liguori | |
| 6,073,188 A | 6/2000 | Fleming | |
| 6,092,169 A | 7/2000 | Murthy et al. | |
| 6,106,568 A | 8/2000 | Beausang et al. | |
| 6,178,215 B1 | 1/2001 | Zhang et al. | |
| 6,192,492 B1* | 2/2001 | Masiewicz et al. | 714/56 |
| 6,223,238 B1 | 4/2001 | Meyer et al. | |
| 6,237,052 B1 | 5/2001 | Stolowitz | |
| 6,256,684 B1* | 7/2001 | Klein | 710/35 |
| 6,314,145 B1 | 11/2001 | van Driest | |
| 6,330,687 B1 | 12/2001 | Griffith et al. | |
| 6,363,439 B1 | 3/2002 | Battles et al. | |
| 6,367,033 B1 | 4/2002 | Jibbe | |
| 6,378,039 B1 | 4/2002 | Obara et al. | |
| 6,401,168 B1* | 6/2002 | Williams et al. | 711/112 |
| 6,442,722 B1 | 8/2002 | Nadeau-Dosic | |
| 6,447,340 B1 | 9/2002 | Wu | |
| 6,484,294 B1 | 11/2002 | Kiyoshige et al. | |
| 6,496,900 B1 | 12/2002 | McDonald et al. | |
| 6,549,981 B2 | 4/2003 | McDonald et al. | |
| 6,557,065 B1 | 4/2003 | Peleg et al. | |
| 6,564,271 B2 | 5/2003 | Micalizzi, Jr. et al. | |
| 6,578,126 B1 | 6/2003 | MacLellan et al. | |
| 6,614,842 B1 | 9/2003 | Chou et al. | |
| 6,639,885 B1* | 10/2003 | Yada et al. | 369/53.45 |
| 6,662,076 B1 | 12/2003 | Conboy et al. | |
| 6,678,768 B1 | 1/2004 | Craft | |
| 6,687,775 B1 | 2/2004 | Basset | |
| 6,697,867 B1 | 2/2004 | Chong, Jr. | |
| 6,704,300 B1 | 3/2004 | Chen et al. | |
| 6,735,650 B1* | 5/2004 | Rothberg | 710/74 |
| 6,791,779 B1 | 9/2004 | Singh et al. | |
| 6,792,494 B2 | 9/2004 | Bennett et al. | |
| 6,813,688 B2 | 11/2004 | Wu et al. | |
| 6,845,420 B2 | 1/2005 | Resnick | |
| 6,854,045 B2 | 2/2005 | Ooi et al. | |
| 6,895,455 B1* | 5/2005 | Rothberg | 710/74 |
| 6,898,655 B1 | 5/2005 | Sutardja | |
| 6,908,330 B2 | 6/2005 | Garrett et al. | |
| 6,915,380 B2 | 7/2005 | Tanaka et al. | |
| 6,917,992 B2 | 7/2005 | Grimsrud et al. | |
| 6,922,738 B2 | 7/2005 | Drescher et al. | |
| 6,928,509 B2 | 8/2005 | Surugucchi | |
| 6,961,813 B2 | 11/2005 | Grieff et al. | |
| 6,973,535 B2* | 12/2005 | Bruner et al. | 711/112 |
| 6,978,337 B1 | 12/2005 | Chang | |
| 7,089,345 B1 | 8/2006 | Lynn | |
| 7,200,074 B2* | 4/2007 | Kano et al. | 369/30.28 |
| 7,200,698 B1* | 4/2007 | Rothberg | 710/74 |
| 7,234,005 B2* | 6/2007 | Yoshitake | 710/9 |
| 7,373,456 B2* | 5/2008 | Yamazaki et al. | 711/114 |
| 7,453,774 B2* | 11/2008 | Kano et al. | 369/30.28 |
| 7,461,203 B2* | 12/2008 | Suzuki et al. | 711/114 |
| 2002/0159311 A1 | 10/2002 | Coffey et al. | |
| 2002/0186706 A1 | 12/2002 | Chren et al. | |
| 2003/0005231 A1 | 1/2003 | Ooi et al. | |
| 2003/0035504 A1 | 2/2003 | Wong et al. | |
| 2003/0074515 A1 | 4/2003 | Resnick | |
| 2003/0135577 A1 | 7/2003 | Weber et al. | |
| 2003/0135674 A1* | 7/2003 | Mason et al. | 710/74 |
| 2003/0145264 A1 | 7/2003 | Siegel et al. | |
| 2003/0167367 A1 | 9/2003 | Kaushik et al. | |
| 2003/0182506 A1* | 9/2003 | Kusumi | 711/117 |
| 2003/0236952 A1 | 12/2003 | Grieff et al. | |
| 2004/0015637 A1 | 1/2004 | Yau | |
| 2004/0024950 A1 | 2/2004 | Surugucchi | |
| 2004/0044802 A1 | 3/2004 | Chiang et al. | |
| 2004/0052045 A1* | 3/2004 | Botchek | 361/685 |
| 2004/0068591 A1 | 4/2004 | Workman et al. | |
| 2004/0081179 A1 | 4/2004 | Gregorcyk, Jr. | |
| 2004/0083323 A1 | 4/2004 | Rabinovitz et al. | |
| 2004/0083324 A1 | 4/2004 | Rabinovitz et al. | |
| 2004/0088441 A1 | 5/2004 | Chiang et al. | |
| 2004/0097124 A1* | 5/2004 | Garrett et al. | 439/378 |
| 2004/0100944 A1 | 5/2004 | Richmond et al. | |
| 2004/0107340 A1* | 6/2004 | Wann et al. | 713/153 |
| 2004/0113662 A1 | 6/2004 | Grimsrud | |
| 2004/0117522 A1 | 6/2004 | Loffink et al. | |
| 2004/0120353 A1 | 6/2004 | Kim et al. | |
| 2004/0128627 A1* | 7/2004 | Zayas | 716/1 |
| 2004/0139214 A1* | 7/2004 | Hinshaw et al. | 709/231 |
| 2004/0151040 A1* | 8/2004 | Minami | 365/200 |
| 2004/0198104 A1 | 10/2004 | Hadba et al. | |
| 2004/0199515 A1 | 10/2004 | Penny et al. | |
| 2004/0203295 A1 | 10/2004 | Hadba et al. | |
| 2004/0205288 A1 | 10/2004 | Ghaffari et al. | |
| 2004/0252716 A1 | 12/2004 | Nemazie | |
| 2004/0264284 A1 | 12/2004 | Priborsky et al. | |
| 2005/0005216 A1 | 1/2005 | Chameshlu et al. | |
| 2005/0015655 A1 | 1/2005 | Clayton et al. | |
| 2005/0024083 A1 | 2/2005 | Kitzmura et al. | |
| 2005/0027894 A1 | 2/2005 | Ayyavu et al. | |
| 2005/0055501 A1 | 3/2005 | Guha et al. | |
| 2005/0086413 A1* | 4/2005 | Lee et al. | 710/313 |
| 2005/0108452 A1* | 5/2005 | Loffink | 710/74 |
| 2005/0120173 A1* | 6/2005 | Minowa | 711/114 |
| 2005/0144490 A1 | 6/2005 | Igari | |
| 2005/0182874 A1* | 8/2005 | Herz et al. | 710/74 |
| 2005/0204078 A1 | 9/2005 | Steinmetz et al. | |
| 2005/0229249 A1* | 10/2005 | Piwonka et al. | 726/22 |
| 2005/0246475 A1 | 11/2005 | Ervin | |
| 2005/0251588 A1 | 11/2005 | Hoch et al. | |
| 2006/0095813 A1* | 5/2006 | Yagisawa et al. | 714/55 |
| 2008/0040543 A1* | 2/2008 | Yamazaki et al. | 711/114 |
| 2008/0172528 A1* | 7/2008 | Yagisawa et al. | 711/114 |

FOREIGN PATENT DOCUMENTS

| | | |
|---|---|---|
| GB | 2 408 624 A | 3/2004 |

OTHER PUBLICATIONS

Authoritative Dictionary; pp. 123-124.
RAID Anatomy 101; Alan Benway; Oct. 2000; 7 pages.
Taking a Ride on the Bus; Alan Benway; Apr. 2000; 5 pages.
Serial ATA Next Generation Storage Interface; Mark Kymin; Jun. 9, 2005; pp. 1-6.
SATA PHY Interface Specification (SAPIS) Draft—Rev 0.90; Intel Corporation; Feb. 8, 2002; pp. 1-12.
SATA Technology; www.sata-or.org; Dec. 15, 2004; 8 pages.
SATA v PATA; Sanjeeb Nanda, Computer Technology Review; Nov. 2002; p. 18.
SATA (FAQs); Seagate Technology LLC; 2005; 3 pages.
Serial ATA: High Speed Serialized AT Attachment; Revision 1.0a; Jan. 7, 2003; APT Technologies, Inc., Dell Computer Corporation, Intel Corporation, Maxtor Corporation, Seagate Technology; 311 pages.
Serial ATA-to-Ultra ATA Adapter; SIIG, Inc.; 2 pages.
Tempo Bridge G5 Serial ATA Interface to Parallel ATA Drive Adapter; Sonnet Technologies, Inc., Revised 2005; 3 pages.
Serial ATA in Servers and Networked Storage; 2002; 12 pages.
Serial ATA II: Port Multiplier, Revision 1.0, Mar. 25, 2003, APT Technologies, Inc., Dell Computer Corporation, Intel Corporation, Maxtor Corporation, Seagate Technology; 34 pages.
Serial ATA II Workgroup; Serial ATA II Specification Port Selector, Proposed Draft; Revision 1.ORC, Jun. 23, 2003; 21 pages.
Information Technology—AT Attachment with Packet Interface—6 (ATA/ATAPI-6), Working Draft, T13 1410D, Revision 3; Peter T. McLean; Oct. 30, 2001; 496 pages.
Serial ATA II: Port Selector, Revision 1.0, Jul. 28, 2003; Dell Computer Corporation, Intel Corporation, Maxtor Corporation, Seagate Technology, Vitesse Semiconductor Corporation; 20 pages.
Serial ATA: High Speed Serialized AT Attachment; Revision 1.0; Aug. 29, 2001; APT Technologies, Inc., Dell Computer Corporation, Intel Corporation, Maxtor Corporation, Seagate Technology; 307 pages.

* cited by examiner

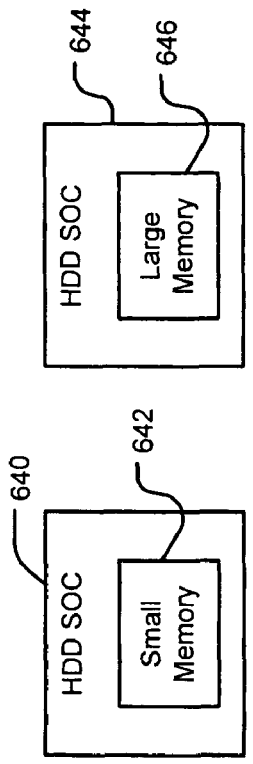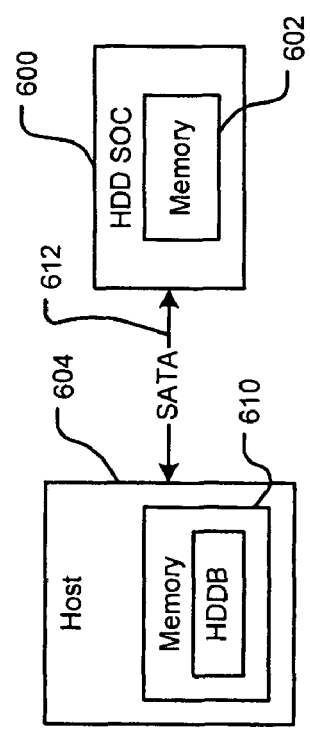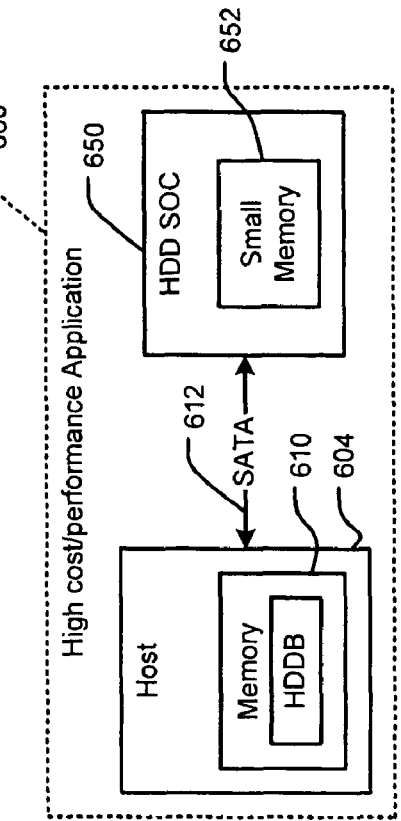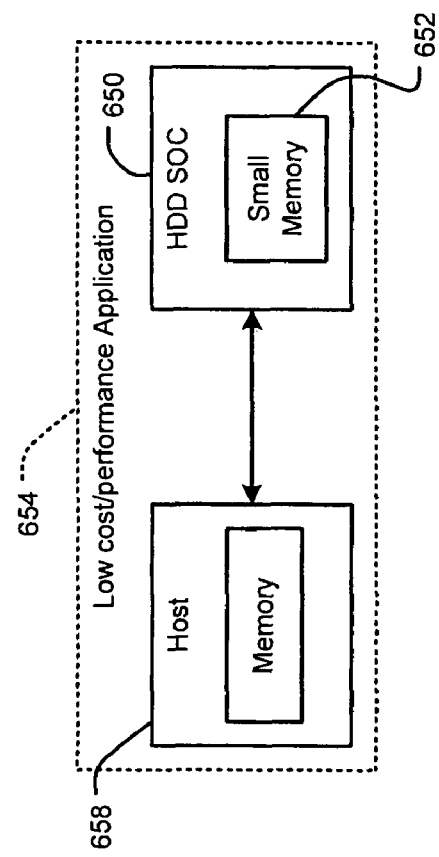
FIG. 12B Prior art
FIG. 12A Prior art
FIG. 11 Prior art
FIG. 13B
FIG. 13A

US 7,958,292 B2

DISK DRIVE SYSTEM ON CHIP WITH INTEGRATED BUFFER MEMORY AND SUPPORT FOR HOST MEMORY ACCESS

CROSS-REFERENCE TO RELATED APPLICATIONS

This application claims the benefit of U.S. Provisional Application No. 60/582,259, filed on Jun. 23, 2004. The disclosure of the above application is incorporated herein by reference.

FIELD OF THE INVENTION

The present invention relates to hard disk drives, and more particularly to increasing buffer memory of an HDD system on chip (SOC) and to improved enterprise systems including HDD SOCs.

BACKGROUND OF THE INVENTION

Host devices such as computers, laptops, personal video recorders (PVRs), MP3 players, game consoles, servers, set-top boxes, digital cameras, and/or other electronic devices often need to store a large amount of data. Storage devices such as hard disk drives (HDD) may be used to meet these storage requirements.

Referring now to FIG. 1, an exemplary hard disk drive (HDD) 10 is shown to include a hard disk drive (HDD) system on chip (SOC) 12 and a hard drive assembly (HDA) 13. The HDA 13 includes one or more hard drive platters 14 that are coated with magnetic layers 15. The magnetic layers 15 store positive and negative magnetic fields that represent binary 1's and 0's. A spindle motor, which is shown schematically at 16, rotates the hard drive platter 14. Generally the spindle motor 16 rotates the hard drive platter 14 at a fixed speed during read/write operations. One or more read/write actuator arms 18 move relative to the hard drive platter 14 to read and/or write data to/from the hard drive platters 14.

A read/write device 20 is located near a distal end of the read/write arm 18. The read/write device 20 includes a write element such as an inductor that generates a magnetic field. The read/write device 20 also includes a read element (such as a magneto-resistive (MR) element) that senses the magnetic field on the platter 14. A preamp circuit 22 amplifies analog read/write signals.

When reading data, the preamp circuit 22 amplifies low level signals from the read element and outputs the amplified signal to a read/write channel device 24. When writing data, a write current is generated which flows through the write element of the read/write device 20. The write current is switched to produce a magnetic field having a positive or negative polarity. The positive or negative polarity is stored by the hard drive platter 14 and is used to represent data.

The HDD SOC 12 typically includes a buffer 32 that stores data that is associated with the control of the hard disk drive and/or buffers data to allow data to be collected and transmitted as larger data blocks to improve efficiency. The buffer 32 may employ DRAM, SDRAM or other types of low latency memory. The HDD SOC 12 further includes a processor 34 that performs processing that is related to the operation of the HDD 10.

The HDD SOC 12 further includes a hard disk controller (HDC) 36 that communicates with a host device via an input/output (I/O) interface 38. The HDC 36 also communicates with a spindle/voice coil motor (VCM) driver 40 and/or the read/write channel device 24. The I/O interface 38 can be a serial or parallel interface, such as an Integrated Drive Electronics (IDE), Advanced Technology Attachment (ATA), or serial ATA (SATA) interface. The spindle/VCM driver 40 controls the spindle motor 16, which rotates the platter 14. The spindle/VCM driver 40 also generates control signals that position the read/write arm 18, for example using a voice coil actuator, a stepper motor or any other suitable actuator. The I/O interface 38 communicates with an I/O interface 44 that is associated with a host device 46.

Referring now to FIG. 2, an exemplary host device 64 is shown to include a processor 66 with memory 67 such as cache. The processor 66 communicates with an input/output (I/O) interface 68. Volatile memory 69 such as random access memory (RAM) 70 and/or other suitable electronic data storage also communicates with the interface 68. A graphics processor 71 and memory 72 such as cache increase the speed of graphics processing and performance.

One or more I/O devices such as a keyboard 73 and a pointing device 74 (such as a mouse and/or other suitable device) communicate with the interface 68. The computer architecture 64 may also include a display 76, an audio output device 77 such as audio speakers and/or other input/output devices that are generally identified at 78.

In use, the HDD is operated independently from the host device. The hard disk drive handles buffering of data locally to improve performance. This approach requires the hard disk drive to include low latency RAM such as DRAM, which increases the cost of the hard disk drive.

Referring now to FIG. 3, a desktop HDD SOC 200 for a host device such as a desktop computer is shown. The HDD SOC 200 includes a processor 204, a hard disk controller (HDC) 208, a read/write channel circuit 212, memory 216 (which can be implemented on chip and/or off chip), and a high speed interface 220. For example, the high speed interface 220 can be a serial or parallel interface such as an ATA and/or SATA interface that communicates with a host device 224. In this embodiment, the spindle/VCM driver is shown integrated with the processor 204. The HDA 13 interfaces with the processor 204 and the read/write channel circuit 212. A host device 226 includes an ATA/SATA interface 228, which communicates with the ATA/SATA interface 220. Operation of the HDD SOC 220 is similar to that described above in conjunction with FIG. 1.

Referring now to FIG. 4, an enterprise HDD SOC 230 for an enterprise device 232 such as a server or other enterprise devices is shown. The HDD SOC 230 includes a spindle/VCM/Data processor 234 that performs processing related to the spindle motor, VCM and/or data processing. The HDD SOC 230 further includes an interface/data processor 236 that performs processing related to the enterprise device interface. The HDD SOC 230 also includes a hard disk controller (HDC) 238, a read/write channel circuit 242, memory 246 (which can be implemented on chip) and a high speed interface 250. For example, the high speed interface 250 can be a serial or parallel interface such as a small computer system interface (SCSI), serial attached SCSI (SAS) or Fiber Channel (FC) interface that communicates with the enterprise device 232 via a high speed interface 251.

Because of the different number of processors and the different output side interfaces that are used, manufacturers have designed and manufactured two different HDD SOC architectures for enterprise and desktop applications. In particular, the desktop HDD SOC 200 includes a single processor while the enterprise HDD SOC 230 includes two processors. In addition, the desktop HDD SOC 200 typically employs an ATA and/or SATA interface while the enterprise server typically employs an SAS and/or FC interface. The separate architectures increase the design inventory and die costs of both devices.

SUMMARY

A circuit for a storage device that communicates with a host device comprises a first high speed interface. A storage controller communicates with the high speed interface. A buffer communicates with the storage controller. The storage device generates storage buffer data during operation and the storage controller is adapted to selectively store the storage buffer data in at least one of the buffer and/or in the host device via the high speed interface.

The first high speed interface includes a serial Advanced Technology Attachment (ATA) interface. A processor, a spindle/VCM driver, and a read/write channel circuit communicate with the storage controller.

A hard drive assembly comprises a hard drive platter that magnetically stores data. A spindle motor rotates the hard drive platter and communicates with the spindle/VCM driver. A read/write arm reads and writes data to the hard drive platter and communicates with the read/write channel circuit.

A system comprises the circuit and further comprises the host device. The host device includes a second high speed interface that communicates with the first high speed interface. Volatile memory stores the storage buffer data from the storage device.

A system on chip (SOC) comprises the circuit.

A multi-chip-module (MCM) comprises the circuit.

A system comprises a host device that includes a processor, volatile memory that communicates with the processor, and a first high speed interface that communicates with at least one of the processor and/or the volatile memory. A storage device includes a second high speed interface that communicates with the first high speed interface. A storage controller communicates with the second high speed interface. A buffer communicates with the storage controller. The storage device generates storage buffer data during operation. The storage controller is adapted to selectively store the storage buffer data in at least one of the buffer and/or in the host device via the first and second high speed interfaces.

A bridge circuit comprises a first interface that provides a serial Advanced Technology Attachment (ATA) interface. A second interface provides one of a serial attached SCSI (SAS) or Fiber Channel (FC) interface. A processor communicates with the first and second interfaces and supports interface and data processing. Memory communicates with the processor.

The first and second interfaces and the processor are implemented as an integrated circuit. The integrated circuit further comprises the memory.

A system comprises the bridge circuit and further comprises a storage device that communicates with the first interface of the bridge circuit. The storage device comprises a third interface that provides a serial Advanced Technology Attachment (ATA) interface and that communicates with the first interface. A storage controller communicates with the third interface. The storage device generates storage buffer data during operation. The storage controller stores the storage buffer data in the bridge circuit via the third and first interfaces.

A circuit for a storage device that communicates with an external device comprises a first interface that provides a serial Advanced Technology Attachment (ATA) interface. A processor performs spindle/VCM and data processing. A storage controller communicates with the first interface end the processor. The storage device generates storage buffer data during operation. The storage controller stores the storage buffer data in the external device via the second high speed interface.

Memory communicates with the storage controller. The storage buffer data is selectively stored in at least one of the memory and/or the external device. A read/write channel circuit communicates with the storage controller.

A bridge chip includes a second interface that provides a serial Advanced Technology Attachment (ATA) interface and that communicates with the first interface. A third interface provides the one of the serial attached SCSI (SAS) or the Fiber Channel (FC) interface.

A system comprises the circuit and further comprising an enterprise device including a fourth interface that communicates with the third interface. The bridge chip further comprises a processor that communicates with the third and fourth interfaces and that performs interface and data processing. The bridge chip communicates with memory. The memory stores the storage buffer data from the storage device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 11 is a functional block diagram of an HDD SOC with FIFO memory and host-based buffering according to the prior art;

FIGS. 12A and 12B are functional block diagrams of low cost/performance HDD SOC and higher performance HDD SOC according to the prior art;

FIG. 13A illustrates an HDD SOC for low cost applications that includes small local memory such as DRAM and that has a disabled host-based buffering function according to one embodiment;

FIG. 13B illustrates an HDD SOC for higher performance/cost applications that includes small local memory such as DRAM and that has an enabled host-based buffering function according to another embodiment;

FIG. 15 illustrates an enterprise application that employs the same HDD SOC as FIG. 14.

DETAILED DESCRIPTION OF THE PREFERRED EMBODIMENTS

Figure 1:
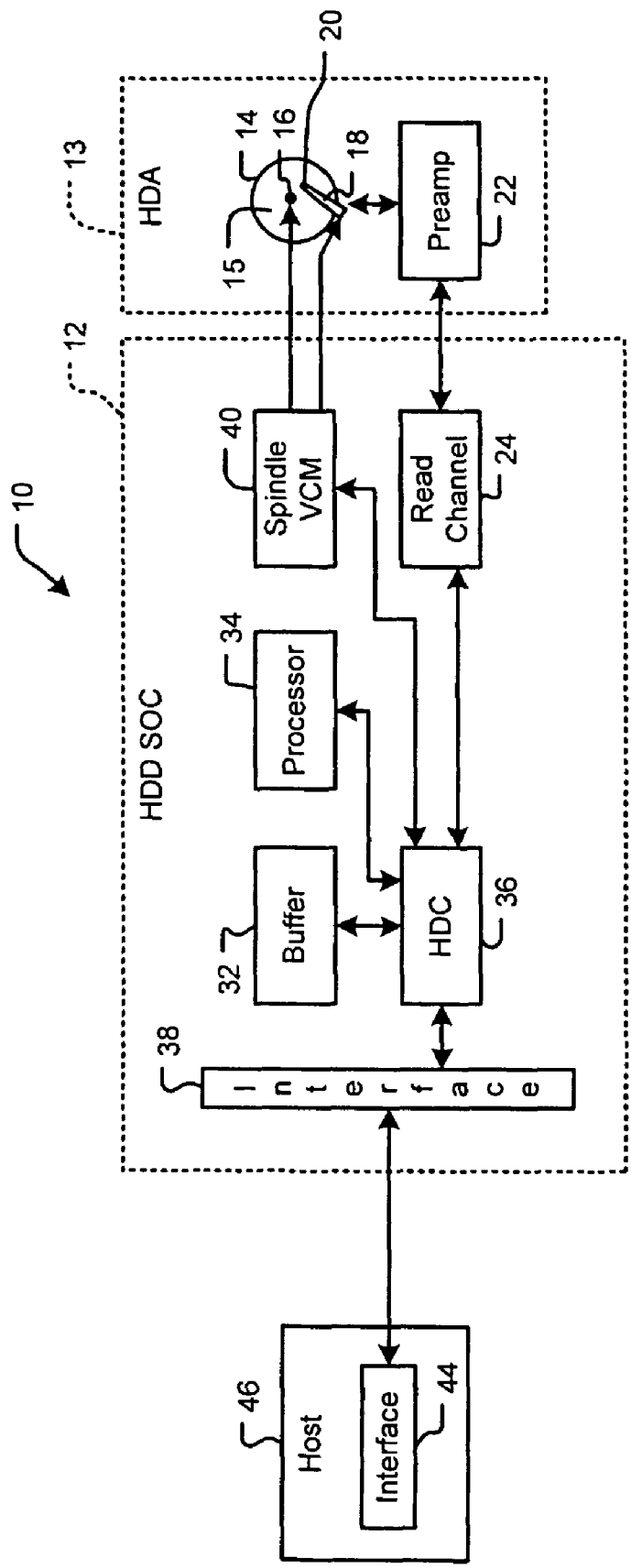
FIG. 1 is a functional block diagram of an exemplary hard disk drive system on chip (SOC) according to the prior art.
Figure 2:
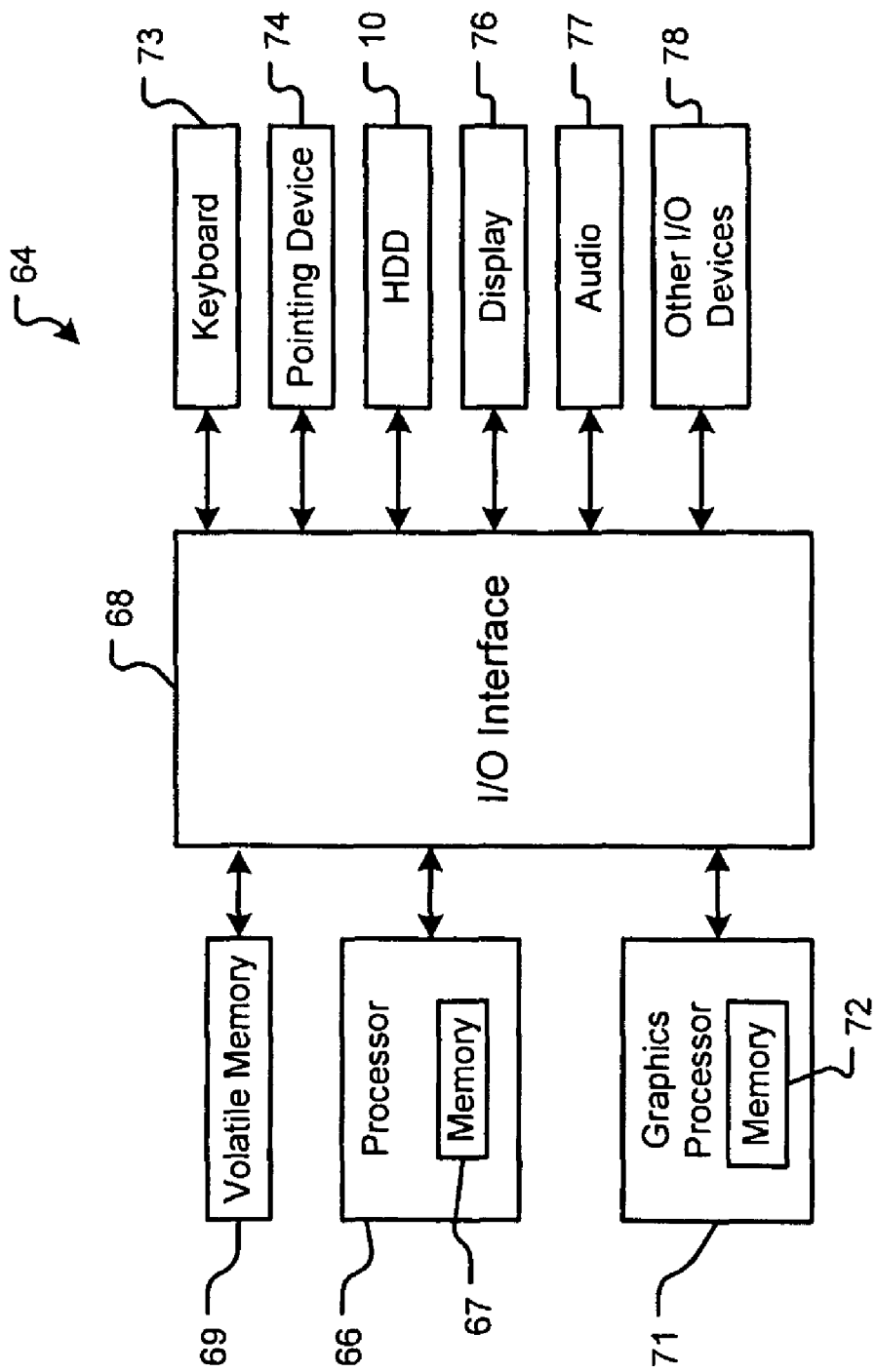
FIG. 2 is a functional block diagram of an exemplary host device according to the prior art.
Figure 3:
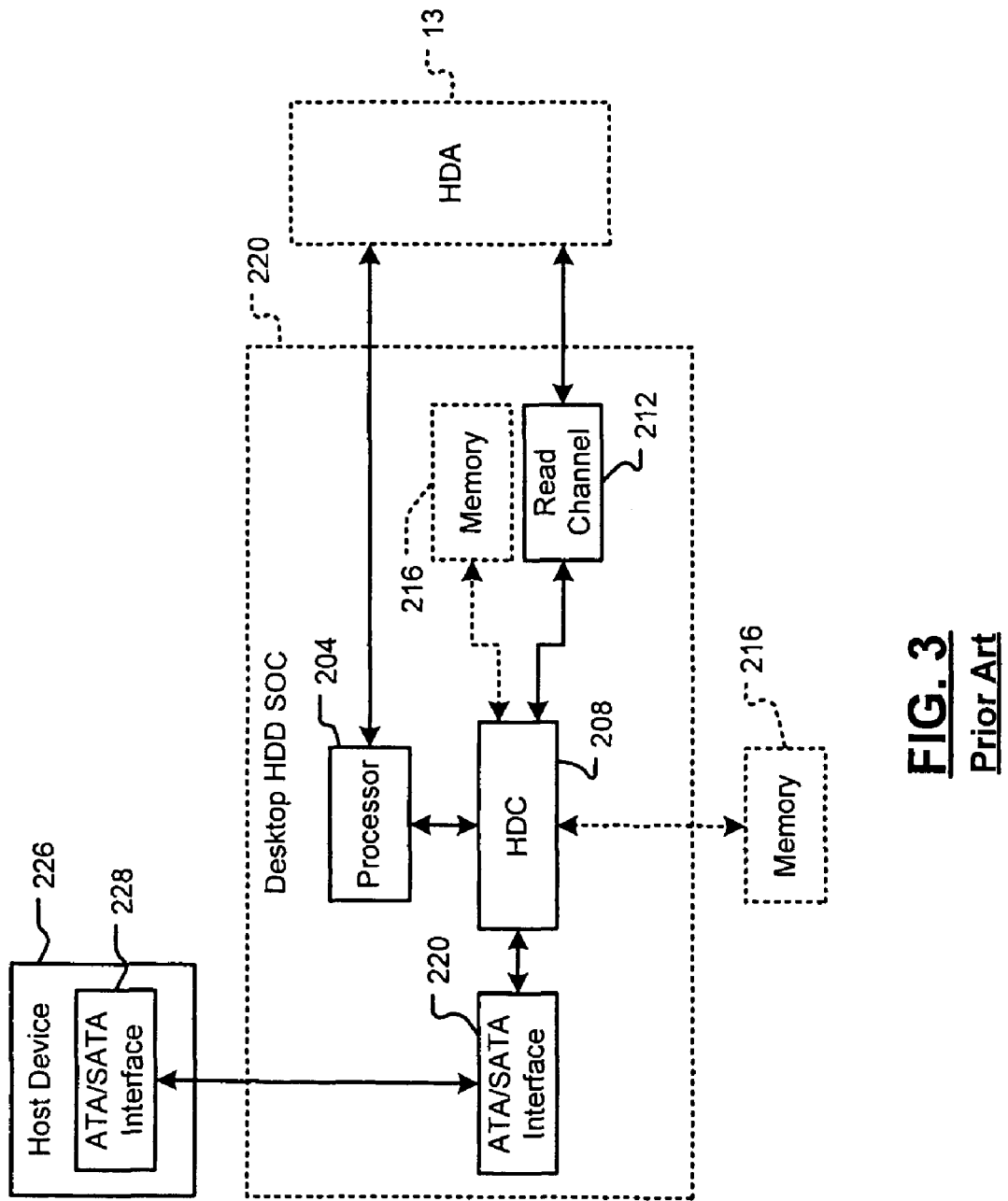
FIG. 3 is a functional block diagram of a desktop HDD SOC according to the prior art.
Figure 4:
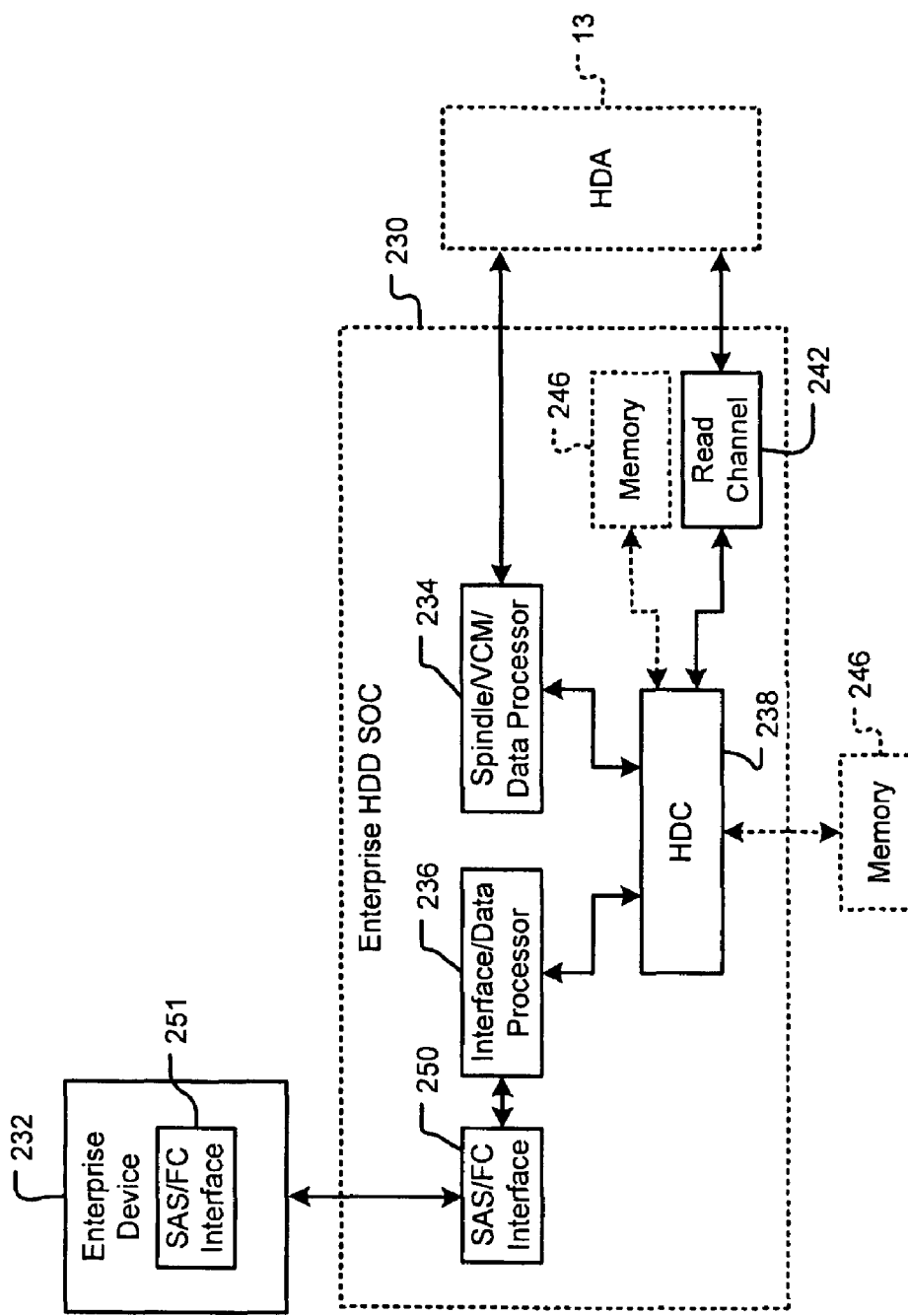
FIG. 4 is a functional block diagram of an enterprise HDD SOC according to the prior art.

The following description of the preferred embodiment(s) is merely exemplary in nature and is in no way intended to limit the invention, its application, or uses. For purposes of clarity, the same reference numbers will be used in the drawings to identify similar elements. While SOCs are disclosed herein, skilled artisans will appreciate that the SOCs may be implemented as multi-chip modules without departing from the invention.

Figure 5:
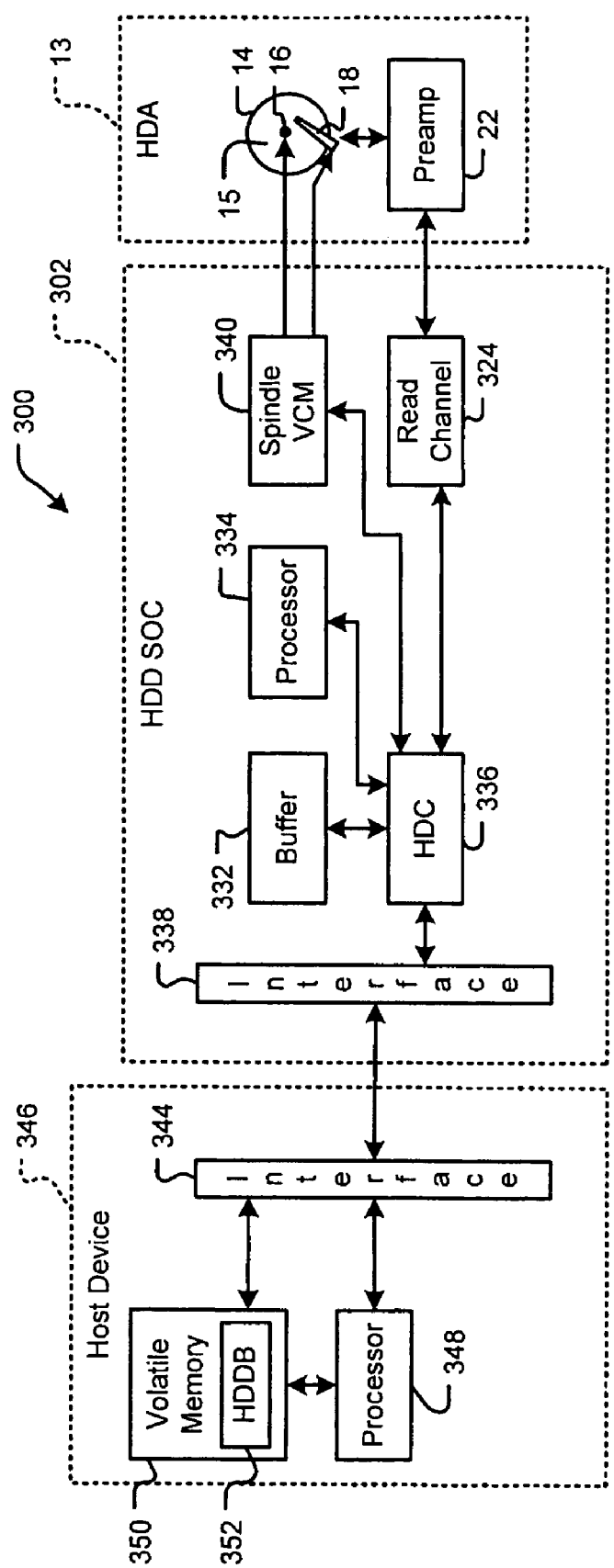
FIG. 5 is a functional block diagram of an exemplary embodiment of a hard disk drive SOC that includes an on-chip buffer and that employs volatile memory of the host device for additional HDD buffering.

Referring now to FIG. 5, a system 300 includes a HDD SOC 302 according to the present invention. The HDD SOC 302 includes a buffer 332 that stores data that is associated with the control of the HDD and/or buffers data to allow data to be collected and transmitted as larger data blocks to improve efficiency. The buffer 332 may employ DRAM or other types of low latency memory. The HDD SOC 302 further includes a processor 334 that performs processing that is related to the operation of the HDD 300, such as spindle/VCM control processing.

The HDD SOC 302 further includes a hard disk controller (HDC) 336 that communicates with a host device via a high speed input/output (I/O) interface 338. The HDC 336 also communicates with a spindle/voice coil motor (VCM) driver 340 and/or the read/write channel device 324. The high speed I/O interface 338 can be a serial ATA (SATA) interface. The spindle/VCM driver 340 controls the spindle motor 16, which rotates the platter 14. The spindle/VCM driver 340 also generates control signals that position the read/write arm 18, for example using a voice coil actuator, a stepper motor or any other suitable actuator. The high speed I/O interface 338 communicates with a high speed I/O interface 344 that is associated with a host device 346.

The host device 346 includes a processor 348 and volatile memory 350. The host device 346 and the HDD SOC 302 allocate part of the volatile memory 350 for a host disk drive buffer (HDDB) 352. The HDD SOC 302 also includes the buffer 332. When additional RAM is needed for buffering, the HDD SOC 302 transmits/receives data over the high speed interface 338 to/from the HDDB 352 located in the volatile memory 350 of the host device 346. For example, nominal speeds of 3 Gb/s and higher can be obtained using a SATA interface. As can be appreciated, the ability to use the buffer 332 on the HDD SOC 302 as well as HDDB 352 of the host device 346 significantly increases the flexibility of the HDD SOC 302. Furthermore, by also including the buffer 332 on the HDD SOC 302, the HDD SOC 302 can also be used in applications that do not enable the HDDB 352.

In one implementation, the host device 346 includes an operating system that allows a user to allocate a variable amount of memory for the HDDB 352 from the volatile memory 350 of the host device 346. In another implementation, the volatile memory 350 is allocated automatically and/or a fixed amount of memory is available for the HDDB 352.

Figure 6:
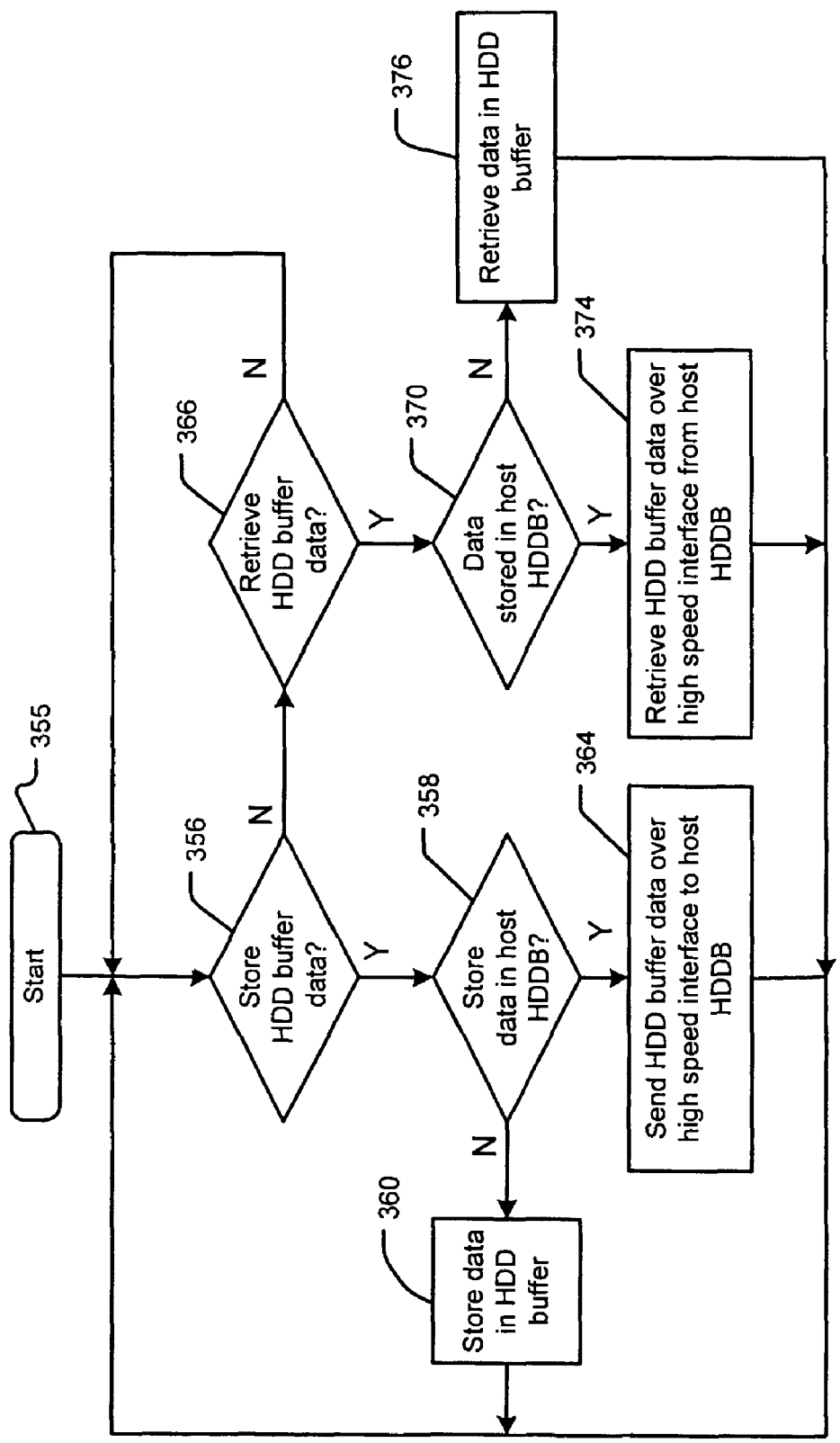
FIG. 6 is a flowchart illustrating steps of an exemplary method for storing and retrieving hard drive buffer data from the volatile memory of the host device.

Referring now to FIG. 6, a method for storing and retrieving hard drive buffer data from the volatile memory 350 of the host device 346 is shown. Control begins in step 355. In step 356, control determines whether there is a request to store buffer data in a HDD buffer. If true, control continues with step 358 and determines whether there is a request to store buffer data in the host HDDB. If step 358 is false, control stores buffer data in the HDD buffer 332 in the HDD SOC 302. If step 358 is true, control sends buffer data over the high speed interface 338 and 344 to the host HDDB 352 in step 364 and control returns to step 356.

If step 356 is false, control determines whether there is a request to retrieve buffer data stored in the HDD buffer data in step 366. If false, control returns to step 354. If step 366 is true, control determines whether the buffer data is stored in the host HDDB 352 in step 370. If step 370 is false, control retrieves buffer data in the HDD buffer 332 of the HDD SOC 302 in step 376 and control returns to step 356. If step 370 is true, control retrieves HDD buffer data over the high speed interface 338 and 344 from the host HDDB 352 in step 374.

As can be appreciated, the HDD SOC 302 provides flexibility to allow use in host device applications that use the SATA interface and host memory for HDD buffering as well as applications that do not.

Figure 7:
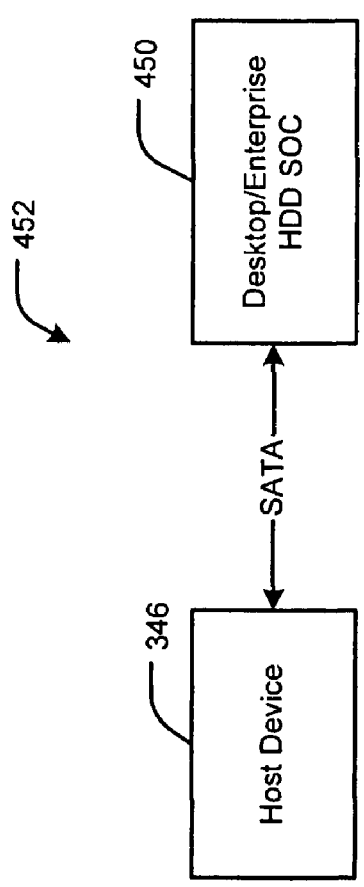
FIG. 7 is a functional block diagram of an exemplary embodiment of a desktop/enterprise SOC implemented in a desktop application.
Figure 8:
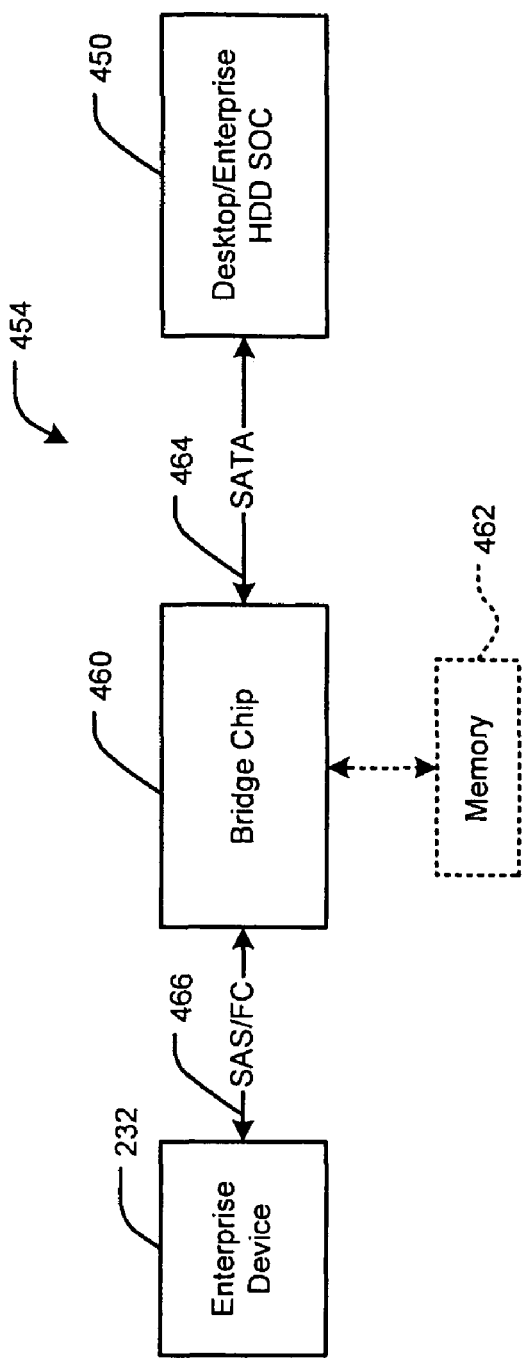
FIG. 8 is an exemplary functional block diagram of the desktop/enterprise SOC and a bridge chip implemented in an enterprise application.

A system according to the present invention includes an HDD SOC and a bridge chip that can be used for enterprise applications. The HDD SOC can also be used for desktop applications. Referring now to FIGS. 7 and 8, a desktop/enterprise HDD SOC 450 can be used for both desktop and enterprise applications 452 and 454, respectively, to reduce cost. The desktop/enterprise HDD SOC 450 communicates with the host device 346. The desktop/enterprise HDD SOC 450 selectively utilizes the volatile memory of the host device 346 as the HDDB 352 as described above.

In FIG. 8, the desktop/enterprise HDD SOC 450 communicates with a bridge chip 460 and memory 462 via an SATA interface 464. The memory 462 can be DRAM or other low latency memory. The bridge chip 460 performs SAS/FC to SATA conversion. The HDD SOC 450 uses a software ATA-like protocol to allocate the buffer memory requirements between the memory 486 and the memory 462. Generally, the buffer 462 will be used when the capacity of the memory 486 associated with the HDD SOC 450 is exceeded. Other adaptive techniques may be used to determine the buffer memory allocation and use.

In some implementations, a faster processor can be used for enterprise applications and premium desktop applications while lower speed processors can be used for desktop applications and low cost enterprise applications. The ability to use the same SOC for desktop and enterprise applications allows the benefits of additional volume that is associated with desktop applications to be shared by the generally lower volumes that are associated with enterprise applications. Furthermore, since the same SOCs can be used for both, only one SOC needs to be stored in inventory for both applications.

Figure 9:
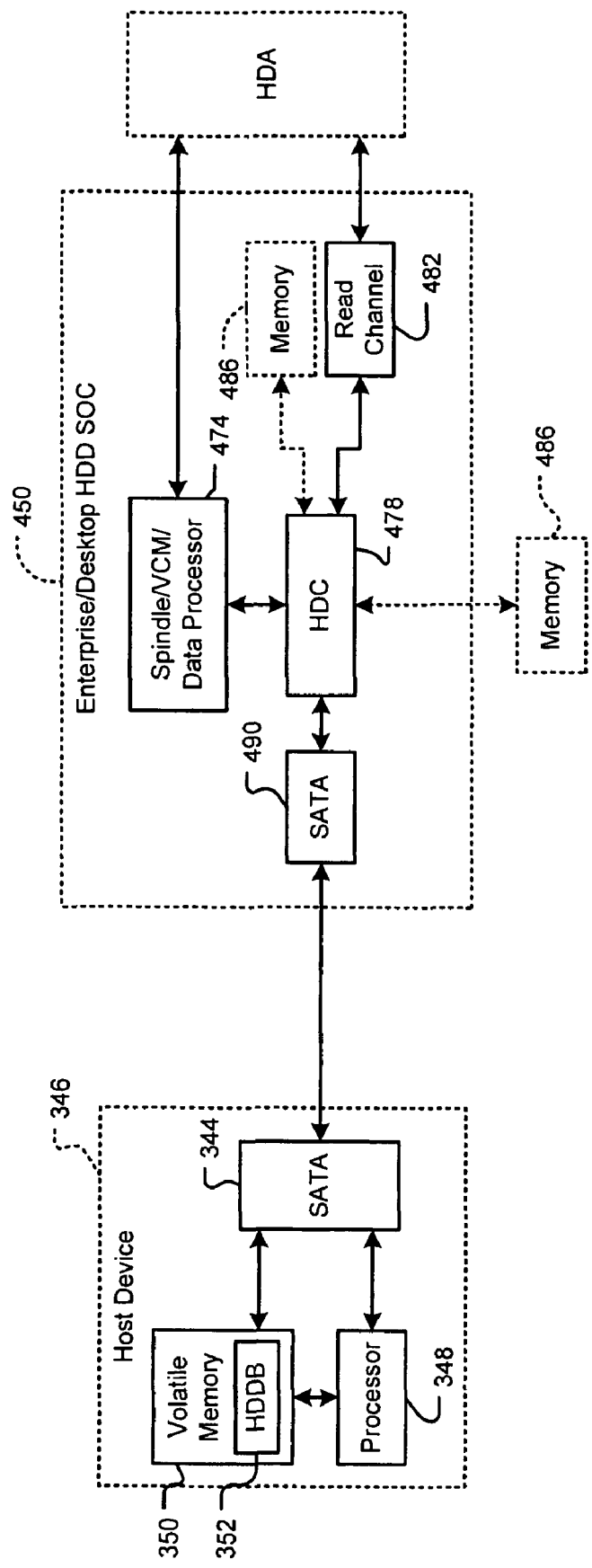
FIG. 9 is a more detailed block diagram of the desktop/enterprise SOC of FIG. 7 implemented in a desktop application.

Referring now to FIG. 9, the desktop/enterprise HDD SOC 450 communicates with the host device 346. The desktop/enterprise HDD SOC 450 selectively utilizes the HDDB 352 as buffer memory when needed as described above. When additional RAM is needed for buffering, the desktop/enterprise HDD SOC 450 transmits/receives data over the high speed interface 344 and 490 to/from the HDDB 352 located in the volatile memory 350 of the host device 346. As can be appreciated, the ability to use the buffer memory 486 on the desktop/enterprise HDD SOC 450 as well as HDDB 352 of the host device 346 significantly increases the flexibility of the desktop/enterprise HDD SOC 450. Furthermore, by also including the buffer 486 on the desktop/enterprise HDD SOC 450, the desktop/enterprise HDD SOC 450 can also be used in applications that do not enable the HDDB 352.

Figure 10:
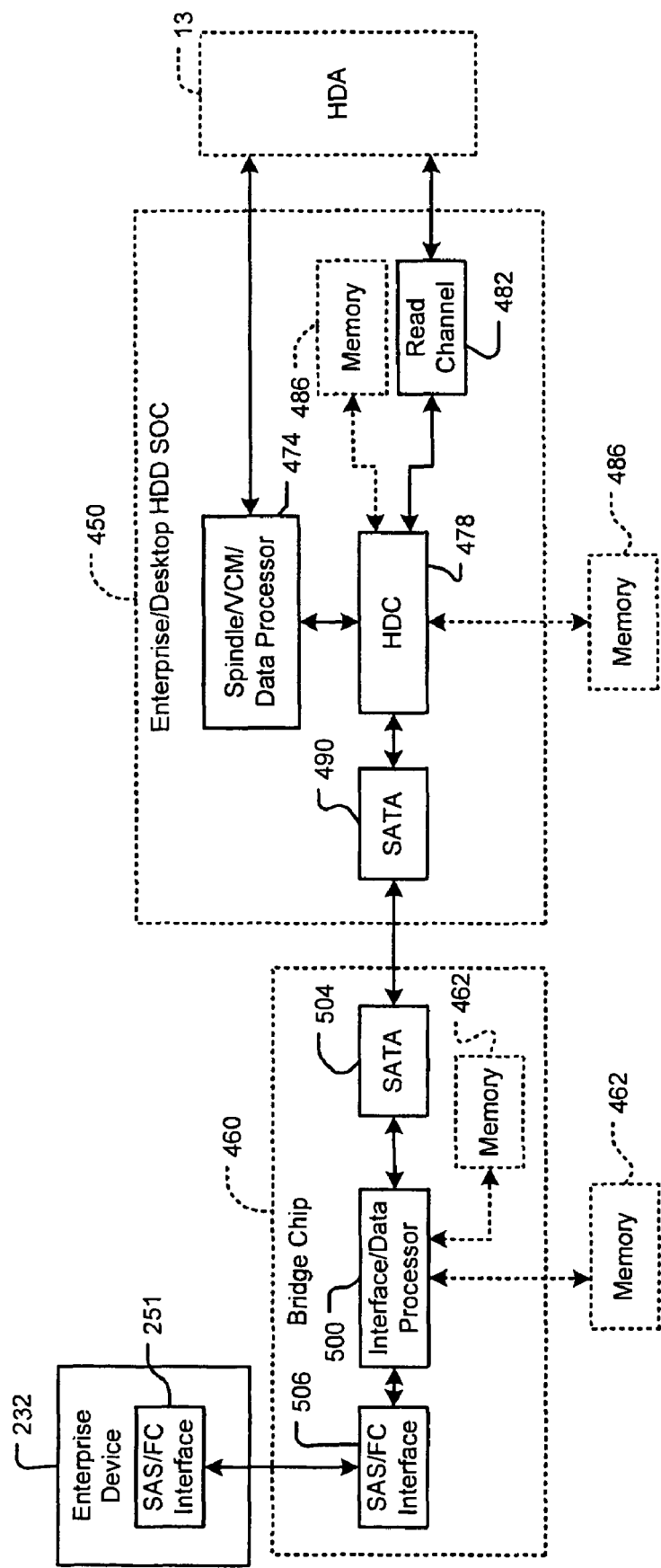
FIG. 10 is a more detailed functional block diagram of the desktop/enterprise SOC and the bridge chip of FIG. 8.

Referring now to FIG. 10, the desktop/enterprise HDD SOC 450 is shown. The desktop/enterprise HDD SOC 450 includes a processor 474, a hard disk controller (HDC) 478, a read/write channel circuit 482, memory 486 (which can be implemented on chip and/or off chip), and a high speed interface 490. The memory can be low latency memory such as DRAM or other low latency memory. The memory 486 can include embedded 1-T DRAM memory. The high speed interface 490 can be a SATA interface that communicates with the host device 424 in desktop applications (as shown in FIG. 7 and 9) or a bridge chip 460 as shown in FIGS. 8 and 10. The bridge chip 460 includes an SAS/FC/Data processor 500 and an SATA interface 504. Memory 462 can be on chip and/or off chip as shown. The memory 462 can be low latency memory such as DRAM or other low latency memory. The SAS/FC/Data processor 500 communicates with the enterprise device 232 via interfaces 506 and 251. The interfaces 506 and 251 can be SAS/FC interfaces and the enterprise device 232 can be a server.

Some host devices cannot currently handle host-based buffer memory for the HDD SOC. In other words, there will be a transition period between an old business model and a new business model. In the old business model, the host device does not have drivers that support host-based buffering and the HDD SOC and/or MCM have sufficient buffer memory to support HDD operations. In the new business model, the HDD SOC and/or MCM have very small FIFO memory and the host has drivers that support host-based buffering. Embodiments of the present invention can make the transition between the old and new business models.

Referring now to FIG. 11, an HDD SOC 600 that is designed for host-based buffering usually includes a very small memory 602 that is typically used only for FIFO purposes. The memory 602 typically has a capacity that is less than 1 MB, for example some HDD SOC 600 include approximately 32 kB of memory. A host 604 includes memory 610 that supports host-based buffering over a high speed interface 612 such as but not limited to the SATA that is shown. When these HDD SOCs 600 are used with hosts 604 that do not support host-based buffering, system performance degrades significantly due to the small size of the memory 602, which cannot support high speed operation.

Referring now to FIGS. 12A and 12B, low cost/performance HDD SOCs 640 that are not designed for host-based buffering typically use greater than 4 MB of memory 642 and less than 64 MB. For example, 16 MB of memory may be used. Higher cost/performance HDD SOCs 644 typically use greater than or equal to 64 MB of memory 646.

Referring now to FIGS. 13A and 13B, an HDD SOC 650 according to the present invention includes memory 652 with no external interface for additional memory. The memory 652 can be DRAM and can have a capacity of 16 MB. The HDD SOC 650 according to the present invention selectively enables host-based buffering. For lower cost/performance applications 654, the HDD SOC 650 utilizes the memory 652 and host-based buffering with a host 658 is disabled as shown in FIG. 13A. In higher cost/performance applications 660, the HDD SOC 650 utilizes the memory 652 and host-based buffering is enabled as shown in FIG. 13B.

One benefit of this approach is the ability to eliminate external pins on the HDD SOC 650 for memory expansion. Therefore smaller dies can be used and fabrication costs are reduced since pads are expensive to fabricate (particularly for CMOS≦90 nm). Pads may also require electrostatic discharge protection (ESD), which also increases fabrication and design costs.

Figure 14:
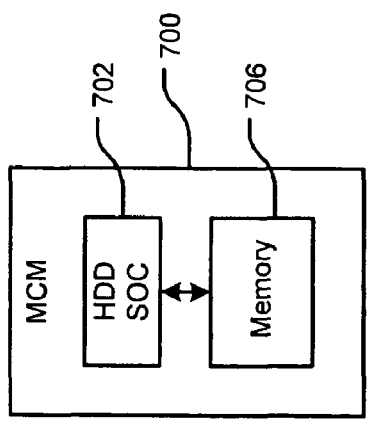
FIGS. 14 and 15 illustrate an MCM with an HDD SOC and a small local memory such as DRAM.
Figure 15:
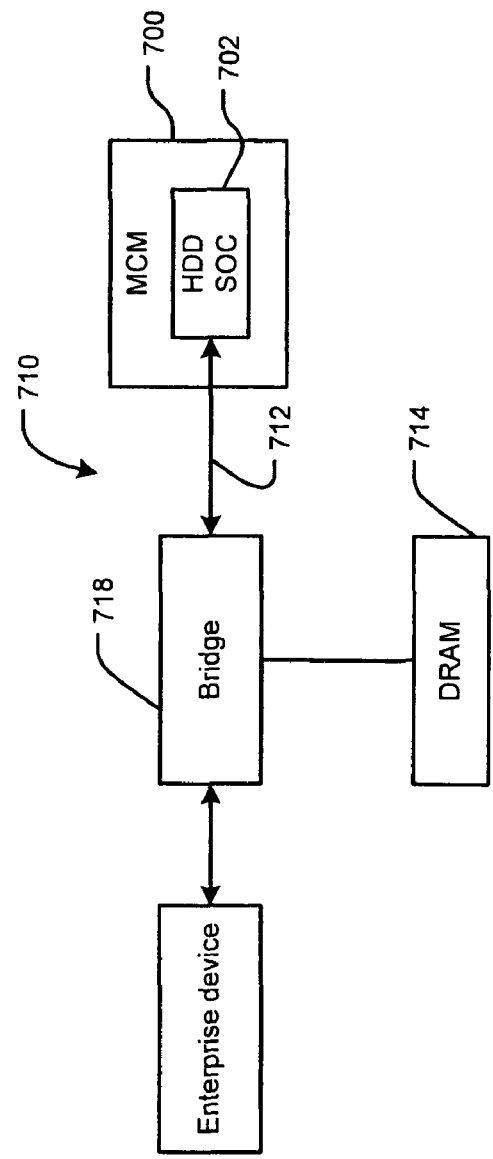

Referring now to FIGS. 14 and 15, for HDD MCM, pads can be made smaller, which poses a lower ESD concern. Furthermore, a single die can be used for HDD MCM to handle applications with no local HDD memory and for applications with local HDD memory. For example, an HDD MCM 700 can include the HDD SOC 702 and memory 704 for desktop applications. The same HDD SOC 700 can be used in enterprise applications 710 with or without using the memory 706. In this case, the HDD SOC 702 uses a high speed interface 712 such as SATA to memory 714 that is associated with a bridge circuit 718 as described above.

As can be appreciated, the HDD SOCs 450, 460 and 302 can be packaged as multi-chip modules if desired. While embodiments of the present invention have been described in conjunction with magnetic storage systems, skilled artisans will appreciate that the present invention may also be used in conjunction with optical and/or other data read only and/or read/write systems. Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. A circuit for a magnetic storage device, comprising:
a first high speed interface configured to operate as an enterprise interface;
a storage controller in communication with the first high speed interface;
a buffer of the magnetic storage device in communication with the storage controller; and
a bridge circuit that is connected between the first high speed interface and a desktop interface, wherein the bridge circuit is configured to store storage-related buffer data, wherein the storage related buffer data is to be stored on a disk of the magnetic storage device,
wherein the magnetic storage device is configured to generate the storage-related buffer data during operation based on host data received from a host device, wherein the storage-related buffer data includes the host data,
wherein the storage controller is configured to
store the storage-related buffer data in the buffer prior to being stored on the disk,
transmit and receive the storage-related buffer data over the first high speed interface to and from another storage device of the host device, wherein the another storage device (i) is external to the magnetic storage device and (ii) includes the desktop interface,
determine whether the buffer has available capacity for the storage-related buffer data, and
store the storage-related buffer data in the bridge circuit and the another storage device (i) when the buffer does not have available capacity for the storage-related buffer data and (ii) prior to the storage-related buffer data being stored on the disk, and
wherein the bridge circuit transfers the storage-related buffer data from the host device back to the magnetic storage device based on a request to retrieve buffer data generated by the magnetic storage device.

2. The circuit of claim 1, wherein the first high speed interface includes an interface.

3. The circuit of claim 1, further comprising:
a processor in communication with the storage controller;
a spindle/VCM driver in communication with the storage controller; and
a read/write channel circuit in communication with the storage controller.

4. The circuit of claim 3, further comprising a storage assembly that comprises:
a storage medium configured to store data;
a spindle motor (i) configured to rotate the storage medium and (ii) in communication with the spindle/VCM driver; and
a read/write arm (i) configured to read and write data to and from the storage medium and (ii) in communication with the read/write channel circuit.

5. A system comprising:
the circuit of claim 1; and
the host device configured to transmit and receive the storage-related buffer data to and from the storage device.

6. The system of claim 5, wherein the host device includes:
a second high speed interface in communication with the first high speed interface; and
volatile memory, wherein at least part of the volatile memory stores the storage-related buffer data from the storage device.

7. A system on chip (SOC) comprising the circuit of claim 1.

8. A multi-chip-module (MCM) comprising the circuit of claim 1.

9. A system on chip (SOC) comprising the circuit of claim 3.

10. A multi-chip-module (MCM) comprising the circuit of claim 3.

11. The circuit of claim 1, wherein the storage-related buffer data includes hard-disk drive control data.

12. The circuit of claim 1, wherein:
the storage controller transmits the storage-related buffer data to a portion of a memory; and
the portion of the memory is external to and allocated to the magnetic storage device.

13. The circuit of claim 12, wherein the memory includes volatile memory.

14. The circuit of claim 1, further comprising a memory external to the magnetic storage device,
wherein a fixed portion of the memory is allocated to the magnetic storage device.

15. The circuit of claim 1, further comprising a memory external to the magnetic storage device,
wherein a fixed portion of the memory is used solely by the magnetic storage device.

16. A system comprising:
a host device that includes
a processor,
volatile memory in communication with the processor, and
a first high speed interface in communication with at least one of the processor or the volatile memory;
a storage device that includes
a second high speed interface in communication with the first high speed interface,
a storage controller in communication with the second high speed interface, and
a buffer in communication with the storage controller,
wherein the storage device is configured to generate storage-related buffer data during operation based on host data received from the host device, wherein the storage-related buffer data includes the host data and is to be stored on a disk of the storage device, and
wherein the storage controller is configured to
store the storage-related buffer data in the buffer and the volatile memory of the host device via the first high speed interface and the second high speed interface, and
store the storage-related buffer data in the buffer and the volatile memory prior to being stored on the disk; and
a bridge circuit configured to facilitate communication between the first high speed interface and the second high speed interface,
wherein the first high speed interface includes at least one of an enterprise interface or a desktop interface,
wherein the second high speed interface includes the other one of the enterprise interface and the desktop interface,
wherein the bridge circuit is configured to store the storage-related buffer data,
wherein the storage controller (i) determines whether the buffer has available capacity for the storage-related buffer data and (ii) stores the storage-related buffer data in the bridge circuit and the volatile memory when the buffer does not have available capacity for the storage-related buffer data and prior to the storage-related buffer data being stored on the disk, and
wherein the host device transfers the storage-related buffer data back to the storage device based on a request to retrieve buffer data generated by the storage device.

17. The system of claim 16, wherein the storage device further comprises:
a processor in communication with the storage controller;
a spindle/VCM driver in communication with the storage controller; and
a read/write channel circuit in communication with the storage controller.

18. The system of claim 17, wherein the storage device further comprises a storage assembly that includes:
a storage medium configured to store data;
a spindle motor (i) configured to rotate the storage medium and (ii) in communication with the spindle/VCM driver; and
a read/write arm (i) configured to read and write data to and from the storage medium and (ii) in communication with the read/write channel circuit.

19. The system of claim 16, wherein the storage device is implemented as a system on chip.

20. The system of claim 16, wherein the storage device is implemented as a multi-chip-module.

21. The system of claim 17, wherein the storage device is implemented as a system on chip.

22. The system of claim 17, wherein the storage device is implemented as a multi-chip-module.

23. A bridge circuit, comprising:
a first interface configured to provide a serial Advanced Technology Attachment (ATA) interface;
a second interface configured to provide one of a serial attached SCSI (SAS) or Fiber Channel (FC) interface;
a processor (i) in communication with the first interface and the second interface and (ii) configured to support interface and data processing; and
memory in communication with the processor,
wherein the first interface, the second interface, the processor and the memory are implemented as an integrated circuit, wherein one of the first interface and the second interface transfer host data from a host device to a magnetic storage device, wherein one of the first interface and the second interface is configured to receive storage-related buffer data from and generated by the magnetic storage device (i) when a buffer of the magnetic storage device does not have available capacity for the storage-related buffer data and (ii) prior to the storage-related buffer data being stored on a disk of the magnetic storage device, wherein the storage-related buffer data includes the host data, wherein the other one of the first interface and the second interface is configured to transmit the storage-related buffer data from the bridge circuit to the host device (i) when the buffer of the magnetic storage device is full and (ii) prior to the storage-related buffer data being stored on the disk, and wherein at least one of the first interface or the second interface transfer the storage-related buffer data back to the magnetic storage device based on a request to retrieve buffer data generated by the magnetic storage device.

24. A system comprising:
the bridge circuit of claim 23; and
a storage device in communication with the first interface of the bridge circuit.

25. The system of claim 24, wherein the storage device comprises:
a third interface (i) configured to provide a serial Advanced Technology Attachment (ATA) interface and (ii) in communication with the first interface; and
a storage controller in communication with the third interface.

26. The system of claim 25, wherein the storage controller is configured to store the storage-related buffer data in the bridge circuit via the third interface and the first interface.

27. The system of claim 25, wherein the storage device further comprises:
a second processor (i) in communication with the storage controller and (ii) configured to provide spindle/VCM control; and
a read/write channel circuit in communication with the storage controller.

28. The system of claim 27, further comprising a storage assembly that comprises:
a storage medium configured to store data;
a spindle motor (i) configured to rotate the storage medium and (ii) in communication with the second processor; and
a read/write arm (i) configured to read data from and write data to the storage medium and (ii) in communication with the read/write channel circuit.

29. A system comprising:
the bridge circuit of claim 23; and
an enterprise device including a fourth interface (i) in communication with the second interface and (ii) configured to provide the at least one of a serial attached SCSI (SAS) or Fiber Channel (FC) interface.

30. The system of claim 25, wherein the storage device is implemented as a system on chip (SOC).

31. The system of claim 25, wherein the storage device is implemented as a multi-chip-module (MCM).

32. The system of claim 25, wherein the storage-related buffer data is configured to store in at least one of the buffer or the memory.

33. The bridge circuit of claim 23, wherein the processor is coupled between the first interface and the second interface.

34. The bridge circuit of claim 23, wherein the storage-related buffer data is provided to the magnetic storage device from the memory when storage capacity of the buffer is not exceeded.

35. The bridge circuit of claim 23, wherein the memory is allocated for storage of the storage-related buffer data by a system on chip of the magnetic storage device.

36. A circuit for a magnetic storage device in communication with an external device, comprising:
a first interface configured to provide a serial Advanced Technology Attachment (ATA) interface;
a processor configured to perform spindle/VCM and data processing;
a storage controller in communication with the first interface and the processor; and
a bridge chip (i) connected between the first interface and an enterprise interface and (ii) configured to store storage-related buffer data based on host data received from the external device, wherein the storage-related buffer data includes the host data and is to be stored on a disk of the magnetic storage device, wherein the magnetic storage device is configured to generate the storage-related buffer data during operation, wherein the storage controller is configured to
determine whether the buffer has available capacity for the storage-related buffer data,
store the storage-related buffer data in said the bridge chip and the external device via the first interface (i) when a buffer of the magnetic storage device does not have available capacity for the storage-related buffer data and (ii) prior to be stored on the disk, wherein the external device includes the enterprise interface, and wherein the bridge chip transfers the storage-related buffer data from the external device back to the magnetic storage device based on a request to retrieve buffer data generated by the magnetic storage device.

37. The circuit of claim 36, further comprising memory in communication with the storage controller,
wherein the storage-related buffer data is stored in at least one of the memory or the external device.

38. The circuit of claim 36, further comprising a read/write channel circuit in communication with the storage controller.

39. The circuit of claim 38, further comprising a hard drive assembly that comprises:
a storage medium configured to store data;
a spindle motor (i) configured to rotate the storage medium and (ii) in communication with the processor; and
a read/write arm (i) configured to read and write data to and from the storage medium and (ii) in communication with the read/write channel circuit.

40. A system comprising the circuit of claim 36, wherein the bridge chip includes a second interface, wherein the second interface (i) is configured to provide a serial Advanced Technology Attachment (ATA) interface and (ii) is in communication with the first interface and a third interface, and wherein the third interface is configured to provide one of a serial attached SCSI (SAS) or a Fiber Channel (FC) interface.

41. The system of claim 40, further comprising an enterprise device including a fourth interface in communication with the third interface.

42. The system of claim 41, wherein the bridge chip further comprises a processor (i) in communication with the third interface and the fourth interface and (ii) configured to perform interface processing and data processing.

43. The system of claim 42, wherein the bridge chip communicates with memory, and wherein the memory is configured to store the storage-related buffer data from the storage device.

44. A system on chip (SOC) comprising the circuit of claim 36.

45. A multi-chip-module (MCM) comprising the circuit of claim 36.

46. A circuit for a magnetic storage device, the circuit comprising:
  first interface means for providing a high speed interface, wherein the high speed interface is configured to operate as an enterprise interface;
  storage control means for communicating with the first interface means to control storage of data;
  buffer means of the magnetic storage device for storing storage-related buffer data, wherein the buffer means is in communication with the storage control means, and wherein the storage-related buffer data is to be stored on a disk of the magnetic storage device,
  wherein the magnetic storage device is configured to generate the storage-related buffer data during operation based on host data received from a host device, and wherein the storage-related buffer data includes the host data, and
  wherein the storage control means, prior to storing the storage-related buffer data on the disk, (i) stores the storage-related buffer data in the buffer means and (ii) transmits and receives the storage-related buffer data over the first interface means to and from another storage device of the host device, wherein the another storage device is external to the magnetic storage device and includes a desktop interface; and
  bridging means for connecting between the first interface means and the desktop interface and for storing the storage-related buffer data,
  wherein the storage control means
    determines whether the buffer means has available capacity for the storage-related buffer data, and
    stores the storage-related buffer data in the bridging means and in the another storage device when the buffer means does not have available capacity for the storage-related buffer data and prior to the storage-related buffer data being stored on the disk, and
  wherein the bridging means transfers the storage-related buffer data back to the magnetic storage device based on a request to retrieve buffer data generated by the magnetic storage device.

47. The circuit of claim 46, wherein the first interface means includes a small computer system interface (SCSI) interface.

48. The circuit of claim 46, further comprising:
  processing means for processing data and for communicating with the storage control means;
  driver means for generating spindle/VCM signals and for communicating with the storage control means; and
  read/write channel means for communicating with the storage control means.

49. The circuit of claim 48, further comprising a storage assembly that comprises:
  storing means for storing data;
  rotating means for rotating the storing means and for communicating with the driver means; and
  read/write means for reading and writing data to the storing means and for communicating with the read/write channel means.

50. A system comprising the circuit of claim 46, further comprising the host device configured to store the storage-related buffer data.

51. The system of claim 50, wherein the host device includes:
  second interface means for providing a high speed interface and for communicating with the first interface means; and
  volatile storing means for storing data, wherein at least part of the volatile storing means stores the storage-related buffer data from the storage device.

52. A system on chip (SOC) comprising the circuit of claim 46.

53. A multi-chip-module (MCM) comprising the circuit of claim 46.

54. A system on chip (SOC) comprising the circuit of claim 48.

55. A multi-chip-module (MCM) comprising the circuit of claim 48.

56. A system comprising:
  a host device that includes
    processing means for processing data,
    volatile storing means for storing data and for communicating with the processing means, and
    first interface means for providing a high speed interface and for communicating with at least one of the processing means or the volatile storing means;
  a storage device that includes
    second interface means for providing a high speed interface and for communicating with the first interface means,
    storage control means for controlling storage of data and for communicating with the second interface means, and
    buffer means for storing storage-related buffer data and for communicating with the storage control means, wherein the storage-related buffer data is to be stored on a disk of the storage device,
  wherein the storage device generates the storage-related buffer data during operation based on host data received from the host device, wherein the storage-related buffer data includes the host data, and
  wherein the storage control means is configured to
    store the storage-related buffer data in the buffer means and in the host device via the first interface means and the second interface means, and
    store the storage-related buffer data in the buffer means and the host device prior to being stored on the disk; and
  bridging means for facilitating communication between the first interface means and the second interface means,
  wherein the first interface means includes one of an enterprise interface and a desktop interface and the second interface means includes the other one of the enterprise interface and the desktop interface,
  wherein the bridging means stores the storage-related buffer data,
  wherein the storage control means
    determines whether the buffer means has available capacity for the storage-related buffer data, and
    stores the storage-related buffer data in the bridging means and in the host device when the buffer means does not have available capacity for the storage-related buffer data and prior to the storage-related buffer data being stored on the disk, and wherein the bridging means transfers the storage-related buffer data from the host device back to the storage device based on a request to retrieve buffer data generated by the storage device.

57. The system of claim 56, wherein the storage device further comprises:
processing means for processing data and for communicating with the storage control means;
driver means for generating spindle/VCM signals and for communicating with the storage control means; and
read/write channel means for communicating with the storage control means.

58. The system of claim 57, wherein the storage device further comprises a storage assembly, the storage assembly includes:
storing means for storing data;
rotating means for rotating the storing means and for communicating with the driver means; and
read/write means for reading and writing data to the storing means and for communicating with the read/write channel means.

59. The system of claim 56, wherein the storage device is implemented as a multi-chip-module.

60. The system of claim 57, wherein the storage device is implemented as a system on chip.

61. The system of claim 57, wherein the storage device is implemented as a multi-chip-module.

62. A bridge circuit, comprising:
first interface means for providing a serial Advanced Technology Attachment (ATA) interface;
second interface means for providing one of a serial attached SCSI (SAS) or Fiber Channel (FC) interface;
processing means for processing data, for communicating with the first interface means and the second interface means, and for supporting interface processing and data processing;
storing means for storing data and for communicating with the processing means;
implementing the first interface means, the second interface means, the processing means and the storing means as an integrated circuit;
receiving host data from a host device;
transmitting the host data from the bridge circuit to the storing means;
receiving storage-related buffer data from and generated by a magnetic storage device via one of the first interface and the second interface when a buffer of the magnetic storage device does not have available capacity for the storage-related buffer data and prior to the storage-related buffer data being stored on a disk of the magnetic storage device, wherein the storage-related buffer data includes the host data;
transmitting the storage-related buffer data from the bridge circuit to the host device via the other one of the first interface and the second interface when the buffer of the magnetic storage device does not have available capacity for the storage-related buffer data; and
transferring the storage-related buffer data from the host device back to the storing means based on a request to retrieve buffer data generated by the magnetic storage device.

63. A system comprising:
the bridge circuit of claim 62; and
a storage device in communication with the bridge circuit.

64. The system of claim 63, wherein the storage device comprises:

third interface means for providing a serial Advanced Technology Attachment (ATA) interface and for communicating with the first interface means; and
storage control means for controlling data storage and for communicating with the third interface means.

65. The system of claim 64, wherein the storage control means stores the storage-related buffer data in the bridge circuit via the third interface means and the first interface means.

66. The system of claim 64, further comprising:
second processing means for communicating with the storage control means and for providing spindle/VCM control; and
read/write channel means for communicating with the storage control means.

67. The system of claim 66, further comprising a storage assembly that comprises:
storing means for storing data;
rotating means for rotating the storing means and for communicating with the second processing means; and
read/write means for reading and writing data to the storing means and for communicating with the read/write channel means.

68. A system comprising:
the storage device of claim 62; and
an enterprise device including fourth interface means for communicating with the second interface means, the fourth interface means providing the at least one of a serial attached SCSI (SAS) or Fiber Channel (FC) interface.

69. The system of claim 63, wherein the storage device is implemented as a system on chip (SOC).

70. The system of claim 63, wherein the storage device is implemented as a multi-chip-module (MCM).

71. The system of claim 64, wherein the storage-related buffer data is stored in at least one of the storing means or the buffer.

72. A circuit for a magnetic storage device, the circuit comprising:
first interface means for providing a serial Advanced Technology Attachment (ATA) interface;
processing means for performing spindle/VCM and data processing; and
storage control means for controlling data storage and for communicating with the first interface means and the processing means;
buffer means for storing storage-related buffer data and for communicating with the storage control means, wherein the storage-related buffer data is to be stored on a disk of the magnetic storage device; and
bridging means for connecting between the first interface means and an enterprise interface and for storing the storage-related buffer data,
wherein the magnetic storage device is configured to generate the storage-related buffer data during operation based on host data received from an external device, wherein the storage-related buffer data includes the host data,
wherein the storage control means stores the storage-related buffer data in the external device via the first interface means and prior to the storage-related buffer data being stored on the disk, wherein the external device includes the enterprise interface,
wherein the storage control means
determines whether the buffer means has available capacity for the storage-related buffer data, and stores the storage-related buffer data in the bridging means and in the external device when the buffer means does not have available capacity for the storage-related buffer data and prior to the storage-related buffer data being stored on the disk, and wherein the bridging means transfers the storage-related buffer data from the external device back to the magnetic storage device based on a request to retrieve buffer data generated by the magnetic storage device.

73. The circuit of claim 72, wherein the storage-related buffer data is stored in at least one of the buffer means or the external device.

74. The circuit of claim 72, further comprising read/write channel means for communicating with the storage control means.

75. The circuit of claim 74, further comprising a storage assembly that comprises:
   storing means for storing data;
   rotating means for rotating the storing means; and
   read/write means for reading data from and writing data to the storing means and for communicating with the read/write channel means.

76. The system comprising the circuit of claim 72, wherein the bridging means includes a second interface means for providing a serial Advanced Technology Attachment (ATA) interface and for communicating with the first interface means and third interface means for providing one of a serial attached SCSI (SAS) or a Fiber Channel (FC) interface.

77. The system of claim 76, further comprising an enterprise device including fourth interface means for communicating with the third interface means.

78. The system of claim 77, wherein the bridging means further comprises processing means for communicating with the third interface means and the fourth interface means to perform interface and data processing.

79. The system of claim 78, wherein the bridging means communicates with buffer storing means for storing the storage-related buffer data from the storage device.

80. A system on chip (SOC) comprising the circuit of claim 72.

81. A multi-chip-module (MCM) comprising the circuit of claim 72.

82. A method for operating a magnetic storage device that communicates with a host device, the method comprising:
   providing a high speed interface configured to operate as an enterprise interface between the magnetic storage device and the host device, wherein the magnetic storage device includes a local buffer and a desktop interface;
   generating storage-related buffer data via the magnetic storage device based on host data received from the host device, wherein the storage-related buffer data includes the host data and is data to be stored on a disk of the magnetic storage device;
   storing the storage-related buffer data in the local buffer prior to being stored on the disk;
   transmitting and receiving the storage-related buffer data over the high speed interface to and from the host device prior to being stored on the disk;
   providing a bridge circuit connected between the high speed interface and the desktop interface;
   determining whether the local buffer has available capacity for the storage-related buffer data;
   storing the storage-related buffer data in the bridge circuit and in the host device when the local buffer does not have available capacity for the storage-related buffer data and prior to the storage-related buffer data being stored on the disk; and
   transferring the storage-related buffer data from the host device back to the magnetic storage device based on a request to retrieve buffer data generated by the magnetic storage device.

83. The method of claim 82, wherein the high speed interface includes a small computer system interface (SCSI) interface.

84. The method of claim 82, further comprising using volatile storage associated with the host device for storing the storage-related buffer data.

* * * * *